(12) United States Patent
Kato et al.

(10) Patent No.: US 11,750,047 B2
(45) Date of Patent: Sep. 5, 2023

(54) MOTOR AND COMPRESSOR INCLUDING THE SAME

(71) Applicant: Mitsubishi Electric Corporation, Tokyo (JP)

(72) Inventors: Keisuke Kato, Tokyo (JP); Koji Masumoto, Tokyo (JP); Yuki Tamura, Tokyo (JP); Nobukazu Kosone, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 160 days.

(21) Appl. No.: 17/442,763

(22) PCT Filed: May 29, 2019

(86) PCT No.: PCT/JP2019/021337
§ 371 (c)(1),
(2) Date: Sep. 24, 2021

(87) PCT Pub. No.: WO2020/240735
PCT Pub. Date: Dec. 3, 2020

(65) Prior Publication Data
US 2022/0190653 A1    Jun. 16, 2022

(51) Int. Cl.
*H02K 1/16*    (2006.01)
*H02K 3/32*    (2006.01)
(Continued)

(52) U.S. Cl.
CPC ............... *H02K 1/16* (2013.01); *H02K 3/32* (2013.01); *H02K 3/48* (2013.01); *H02K 3/345* (2013.01)

(58) Field of Classification Search
CPC .. H02K 1/16; H02K 3/32; H02K 3/34; H02K 3/345; H02K 3/48
(Continued)

(56) References Cited

U.S. PATENT DOCUMENTS 6,008,563 A * 12/1999 Baba .................. H02K 1/146
                                                      310/194
2011/0243768 A1* 10/2011 Taema .................. H02K 3/522
                                                      310/216.115
(Continued)

FOREIGN PATENT DOCUMENTS

| JP | 2010-200388 A | 9/2010 |
| WO | 2016/132470 A1 | 8/2016 |
| WO | 2018/066112 A1 | 4/2018 |

OTHER PUBLICATIONS

International Search Report of the International Searching Authority dated Aug. 20, 2019 in corresponding International Patent Application No. PCT/JP2019/021337 (and English translation).

*Primary Examiner* — Rashad H Johnson
(74) *Attorney, Agent, or Firm* — POSZ LAW GROUP, PLC

(57) ABSTRACT

A motor includes a stator unit formed by coupling plural stators to one another into an annular shape. Each of the stators has: an iron core having an arc-shaped core-back portion and a tooth portion protruding from the core-back portion, the iron core forming slot portions between the iron core and adjacent ones of the stators; insulating members disposed on both end portions, in the axial direction, of the iron core; insulating films disposed so as to be in contact with inner walls of the slot portions of the iron core; and a winding disposed in the slot portions and wound over the iron core with the insulating members and the insulating films interposed therebetween. In a portion of each of the insulating films that is in contact with the inner wall of the slot portion, at least a portion that is in contact with an outer circumferential surface of the tooth tip portion has a length in the axial direction longer than the length of the iron core in the axial direction. Each of the insulating members has (Continued)

position fixing portions that are engaged with the iron core to fix the position of the insulating member.

9 Claims, 15 Drawing Sheets

(51) Int. Cl.
 *H02K 3/48* (2006.01)
 *H02K 3/34* (2006.01)
(58) Field of Classification Search
 USPC .................................. 310/195, 215, 216.001
 See application file for complete search history.

(56) References Cited

U.S. PATENT DOCUMENTS

| | | | |
|---|---|---|---|
| 2013/0169085 A1* | 7/2013 | Taema | H02K 3/28 310/71 |
| 2013/0221770 A1* | 8/2013 | Yokogawa | H02K 3/345 310/43 |
| 2014/0265711 A1* | 9/2014 | Koshino | H02K 15/0068 310/198 |
| 2014/0300236 A1* | 10/2014 | Takizawa | H02K 3/38 310/198 |
| 2018/0183282 A1* | 6/2018 | Aso | H02K 5/24 |
| 2018/0248419 A1* | 8/2018 | Nigo | H02K 1/02 |
| 2019/0081519 A1* | 3/2019 | Baba | H02K 1/148 |
| 2019/0222081 A1 | 7/2019 | Kato et al. | |
| 2020/0099263 A1* | 3/2020 | Hirosawa | F24F 1/08 |
| 2021/0203196 A1* | 7/2021 | Nigo | H02K 1/16 |
| 2022/0140687 A1* | 5/2022 | Hasegawa | H02K 3/522 62/401 |
| 2022/0166279 A1* | 5/2022 | Shimokawa | H02K 3/325 |
| 2022/0190653 A1* | 6/2022 | Kato | H02K 3/32 |
| 2022/0200390 A1* | 6/2022 | Hirosawa | F04B 35/04 |
| 2022/0239168 A1* | 7/2022 | Hirosawa | H02K 29/03 |
| 2022/0271595 A1* | 8/2022 | Kawamoto | H02K 3/345 |
| 2022/0294280 A1* | 9/2022 | Hasegawa | H02K 1/146 |
| 2023/0047683 A1* | 2/2023 | Takayama | F04D 25/06 |
| 2023/0087038 A1* | 3/2023 | Suzuki | H02K 3/325 310/215 |

* cited by examiner

MOTOR AND COMPRESSOR INCLUDING THE SAME

CROSS REFERENCE TO RELATED APPLICATION

This application is a U.S. national stage application of PCT/JP2019/021337 filed on May 29, 2019, the contents of which are incorporated herein by reference.

TECHNICAL FIELD

The present disclosure relates to a motor installed in a device such as a compressor for a freezer and a compressor including the motor. In particular, the present disclosure relates to an insulating structure.

BACKGROUND ART

Motors of the related art are constituted by an annular stator unit and a rotor that is disposed in a rotating manner on the inner circumferential side relative to the stator unit. The stator unit is configured by coupling plural stators to one another into an annular shape. The stators have iron cores on one-on-one basis and windings that are accommodated in slot portions formed between the iron cores. In each of the slot portions, insulating films are disposed along an inner wall of the slot portion. Insulating members are disposed on both end surfaces, in the axial direction, of the iron core. The windings are wound over the insulating films and the insulating members, thereby being insulated from the iron cores.

Regarding such motors, the rotation of the rotor causes a component such as a bearing to slide, and metallic components rub against one another, thereby generating metallic foreign materials such as abrasion powder. Such metallic foreign materials dissolves in refrigerant and oil to adhere to the windings or the iron cores of the motor, thereby reducing the level of an insulated state. Thus, there has been a proposal regarding a motor having an insulating film in which the length of any part in the axial direction is longer than the length of the iron core in the axial direction for the purpose of improving the insulation between the winding and the iron core (for example, refer to Patent Literature 1). With the motor, an insulation performance is improved by elongating the insulating film to ensure the creepage distance between the iron core and the winding.

CITATION LIST

Patent Literature

Patent Literature 1: Japanese Patent Application No. 2017-500186

SUMMARY OF INVENTION

Technical Problem

Because such metallic foreign materials are attracted to the inner side, in the radial direction, of each of the iron cores by the magnetic force of the rotor, the insulation performance of at least a portion of the iron core to which the metallic foreign materials tend to be adhered is intended to be improved; however, this point is not considered in Patent Literature 1.

In addition, with the motor of Patent Literature 1, an effect of improving the insulation performance is obtained by making the length of any part, in the axial direction, of each of the insulating films longer than the length of each of the iron cores in the axial direction. However, in the motor of Patent Literature 1, the position of the entire motor is fixed by each of the insulating films being held between the insulating members and the iron core. Thus, in view of improving ease of assembly, there is a problem that the ease of assembly is decreased when there is performed a procedure in which, after the insulating members are disposed on the iron core, the insulating films are inserted into gaps between the insulating members and the iron core.

That is, each of the insulating members of Patent Literature 1 has gaps between the insulating member and the iron core, and each of the gaps has a thickness similar or equal to the thickness of the insulating film. Without the insulating film being attached, the position of the insulating member is not fixed relative to the iron core. Thus, there has been a problem that the ease of assembly is decreased by the insulating member being pushed away by the insulating film and being detached from the iron core when the insulating film is inserted into the gap between the insulating member and the iron core.

The present disclosure has been made to solve such an above-described problem, and an object of the disclosure is to provide a motor with which the ease of assembly can be improved while insulation is ensured between a winding and an iron core and to provide a compressor including the motor.

Solution to Problem

A motor according to an embodiment of the present disclosure includes a stator unit formed by coupling plural stators to one another into an annular shape. Each of the stators has: an iron core having an arc-shaped core-back portion and a tooth portion protruding from the core-back portion, the iron core forming slot portions between the iron core and adjacent ones of the stators; insulating members disposed on both end portions, in the axial direction, of the iron core; insulating films disposed so as to be in contact with inner walls of the slot portions of the iron core; and a winding disposed in the slot portions and wound over the iron core with the insulating members and the insulating films interposed therebetween. The tooth portion of the iron core has a tooth base protruding from the core-back portion toward the inner circumferential side and tooth tip portions protruding in the circumferential direction from a distal end portion of the tooth base. Each of the insulating films is disposed so as to be in contact with an inner circumferential surface of the core-back portion, a side surface, in the circumferential direction, of the tooth base, and an outer circumferential surface of the tooth tip portion that are part of the inner wall of the slot portion, and at least a portion of the insulating film that is in contact with the outer circumferential surface of the tooth tip portion has a length in the axial direction longer than a length of the iron core in the axial direction. Each of the insulating members has position fixing portions that are engaged with the iron core to fix the position of the insulating member.

Advantageous Effects of Invention

According to an embodiment of the present disclosure, it is possible to ensure the insulation between the iron core and the winding to which the metallic foreign materials tend to be adhered, because, in a portion of the insulating film that is in contact with the slot portion, at least a portion that is in contact with the outer circumferential surface of the tooth tip portion has a length in the axial direction longer than the length of the iron core in the axial direction. In addition, the insulating member has the position fixing portions that are engaged with the iron core to fix the position of the insulating member. Thus, the insulating member can be fixed to the iron core during assembly, the insulating member can be suppressed from being detached from the iron core when the insulating film is inserted, and the ease of assembly can thereby be improved.

DESCRIPTION OF EMBODIMENTS

Figure 1:
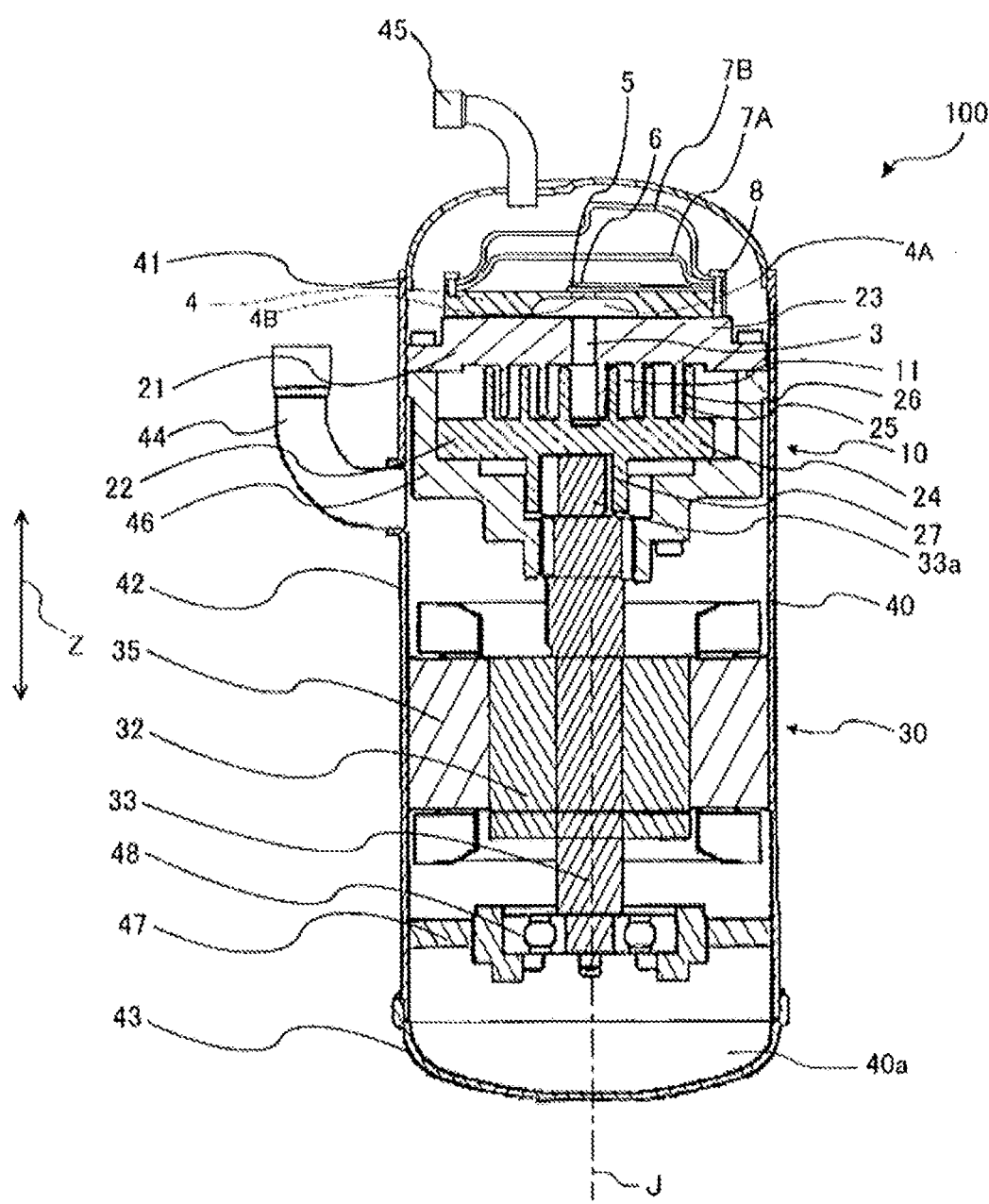
FIG. 1 is a vertical sectional view illustrating the schematic configuration of a compressor 100 according to Embodiment 1.

Hereinafter, embodiments according to the present disclosure will be described with reference to the drawings. Note that, in the drawings, the same or similar parts are denoted by the same references, and the description thereof will appropriately be omitted or simplified. In addition, regarding constituents illustrated in the drawings, for example, the shapes, the sizes, and the arrangement of the constituents can appropriately be modified within the scope of the present disclosure.

Embodiment 1

FIG. 1 is a vertical sectional view illustrating the schematic configuration of a compressor 100 according to Embodiment 1. The compressor 100 according to Embodiment 1 is one of the constituents of a refrigeration cycle apparatus used for, for example, an air-conditioning apparatus, a refrigerator, a freezer, a vending machine, and a water heater.

The compressor 100 is a fluid machine that sucks the refrigerant circulating in a refrigeration cycle, compresses the sucked refrigerant, and discharges the refrigerant. Note that, in the following figures including FIG. 1, for example, the dimensional relationships and shapes of constituent portions may differ from those of the actual constituent portions. In Embodiment 1, as an example of the compressor 100, a scroll compressor will be described. The Z direction in the figure represents the axial direction of the compressor 100. Note that, when the positional relationships and directions used below are described, the expressions "upper" and "lower" that are sometimes used are based on the installation position of the compressor in FIG. 1 unless otherwise particularly specified.

[Compressor 100] As FIG. 1 illustrates, the compressor 100 has a compression mechanism unit 10 including a compression chamber 11 in which refrigerant is compressed, a motor unit 30 that drives the compression mechanism unit 10, and a pressure container 40 accommodating the compression mechanism unit 10 and the motor unit 30. The compression mechanism unit 10 has a discharge port 3 through which the refrigerant compressed in the compression chamber 11 is discharged. The pressure container 40 is constituted by, for example, a cylindrical body 42, an upper container 41 that is press-fitted in an opening at the upper side of the body 42, and a lower container 43 that is press-fitted in an opening at the lower side of the body 42. An oil sump 40a is provided in a bottom portion of the pressure container 40. The oil held in the oil sump 40a passes through an oil supply passage provided in a rotating shaft 33, which will be described later, and the oil is supplied to, for example, a bearing of the rotating shaft 33. In addition, a suction pipe 44 through which the outside refrigerant is sucked into the pressure container 40 and a discharge pipe 45 through which the compressed refrigerant is discharged outside the pressure container 40 are connected to the pressure container 40.

The compressor 100 includes a chamber 4 provided in the pressure container 40 and disposed on a fixed scroll 21. The chamber 4 has a recessed portion 4A internally holding the refrigerant discharged through the discharge port 3 of the compression mechanism unit 10. The recessed portion 4A is recessed in the Z direction from the lower side to the upper side. A central portion of the recessed portion 4A has a discharge port 4B running in the Z direction. Here, the discharge port 3 and the recessed portion 4A communicate with one another, and the recessed portion 4A and the discharge port 4B communicate with one another. Thus, the refrigerant compressed in the compression chamber 11 is discharged, through the discharge port 3, through the recessed portion 4A, and through the discharge port 4B, into a discharge muffler 7A, which will be described later.

In addition, the compressor 100 includes a discharge valve 5 and a valve retainer 6 that are provided in the pressure container 40 and disposed on the chamber 4. Note that one end side portion of the discharge valve 5 and one end side portion of the valve retainer 6 are fixed onto the chamber 4 by using a fixing member 8 constituted by, for example, a bolt. Hereinafter, the discharge valve 5, the valve retainer 6, and the fixing member 8 are collectively referred to as a discharge valve mechanism. In other words, the discharge valve mechanism has the discharge valve 5, the valve retainer 6, and the fixing member 8.

The compressor 100 includes the discharge muffler 7A and a discharge muffler 7B that are disposed in the pressure container 40 and disposed on the chamber 4. The discharge muffler 7B is disposed on the upper side relative to the discharge muffler 7A so as to cover the discharge muffler 7A. Between, for example, the lower surface of the discharge muffler 7A and the upper surface of the chamber 4, there is a space into which refrigerant is discharged through the discharge port 4B. The discharge muffler 7A has, for example, plural holes (not illustrated) through which refrigerant flows from the discharge muffler 7A side to the discharge muffler 7B side. Between, for example, the lower surface of the discharge muffler 7B and the upper surface of the discharge muffler 7A, there is a space into which refrigerant flows from the discharge muffler 7A side. The discharge muffler 7B also has a hole (not illustrated) through which refrigerant flows from the discharge muffler 7B side into a space in the pressure container 40. The refrigerant that has flowed from the discharge muffler 7B is discharged from the compressor 100 through the discharge pipe 45.

The compression mechanism unit 10 has a function of compressing, by being driven by the motor unit 30, the gas refrigerant sucked through the suction pipe 44, in the compression chamber 11 and of discharging the refrigerant into the space in the discharge muffler 7A through the discharge port 3. The compression mechanism unit 10 has the fixed scroll 21 and an orbiting scroll 22.

The fixed scroll 21 is fixed, by bolts or other tools, to a first frame 46 that is positioned in and supported in a fixed manner by the pressure container 40. The fixed scroll 21 has a base plate 23 and a scroll lap 25 that is a protrusion formed into an involute curve shape and arranged vertically on one surface of the base plate 23 (in Embodiment 1, the lower surface). In addition, a central portion of the fixed scroll 21 has the discharge port 3 through which the gas refrigerant that is compressed into high-pressure refrigerant in the compression chamber 11 is discharged. On the outlet side of the discharge port 3 (on the other surface of the base plate 23), there is provided the above-described discharge valve mechanism that opens and closes the discharge port 3 according to the discharge pressure of refrigerant and prevents refrigerant from flowing backward.

The orbiting scroll 22 is supported by the first frame 46 so as to rotate. The orbiting scroll 22 performs a revolving motion (hereinafter, referred to as an orbital motion) relative to the fixed scroll 21 by an Oldham coupling (not illustrated), without rotating on its axis. The orbiting scroll 22 has a base plate 24 and a scroll lap 26 that is a protrusion formed into an involute curve shape and arranged vertically on one surface of the base plate 24 (in Embodiment 1, the upper surface). In addition, a substantially central portion of the other surface (a thrust surface) of the base plate 24 has a hollow cylindrical orbiting-scroll boss 27. An eccentric shaft 33a provided on the upper end of the rotating shaft 33, which will be described later, is fitted in the orbiting-scroll boss 27.

The fixed scroll 21 and the orbiting scroll 22 are fitted to one another in a manner such that the scroll lap 25 and the scroll lap 26 mesh with one another and installed in the pressure container 40. The compression chamber 11 is formed between the scroll lap 25 and the scroll lap 26. In the compression chamber 11, the orbital motion of the orbiting scroll 22 changes the relative positional relationship between the scroll lap 25 and the scroll lap 26 and thus changes the capacity of the compression chamber 11.

The first frame 46 supports the orbiting scroll 22 so that the orbiting scroll 22 can slide on a thrust plate (not illustrated) provided in the first frame 46. The top of the first frame 46 is closed by the fixed scroll 21, and, at the bottom of the first frame 46, a bearing (not illustrated) holding the rotating shaft 33 so that the rotating shaft 33 can rotate is provided. The bearing is constituted by an iron-based magnetic material.

The motor unit 30 has the stator unit 35 fixed to the pressure container 40 and a rotor 32 that is attached to the stator unit 35 so as to rotate and that is driven to rotate by the stator unit 35 being energized. The rotating shaft 33 is attached to the center of the rotor 32. An upper end portion of the rotating shaft 33 has the eccentric shaft 33a fitted in the orbiting-scroll boss 27 so as to rotate. The motor unit 30 drives the orbiting scroll 22 by using the rotating shaft 33, and gas refrigerant is thereby compressed in the compression mechanism unit 10.

Below the motor unit 30, a second frame 47 is fixed to an inner surface of the pressure container 40. The second frame 47 has a function of supporting a ball bearing 48 in the pressure container 40. An outer ring of the ball bearing 48 provided for supporting the lower end of the rotating shaft 33 so that the rotating shaft 33 can rotate is press-fitted in and fixed to a central portion of the second frame 47.

In the compressor 100 having the above-described configuration, when the stator unit 35 of the motor unit 30 is energized, the rotor 32 and the rotating shaft 33 attached to the rotor 32 rotate. By the rotating shaft 33 rotating, the orbiting scrod 22 performs the orbital motion relative to the fixed scroll 21. Thus, the capacity of the compression chamber 11 formed between the scroll lap 25 of the fixed scroll 21 and the scroll lap 26 of the orbiting scroll 22 changes continuously. At this time, when the capacity of the compression chamber 11 increases, the pressure in the compression chamber 11 becomes lower than the pressure in a suction space on the outer circumferential side of the compression chamber 11, and the refrigerant in the pressure container 40 is thereby sucked into the compression chamber 11.

Subsequently, as the capacity of the compression chamber 11 decreases due to the orbital motion of the orbiting scroll 22, the refrigerant sucked into the compression chamber 11 is compressed, and the pressure in the compression chamber 11 thereby increases. When the pressure in the compression chamber 11 exceeds a predetermined pressure, the compressed refrigerant pushes up the discharge valve 5 of the discharge valve mechanism and is discharged into the space in the discharge muffler 7A.

Note that, although the example of the compressor 100 that is a scroll compressor is described here, the compressor 100 is not limited such a scroll compressor and may be a rotary compressor or a screw compressor.

[Outline Configuration of Stator Unit 35]

Hereinafter, the stator unit 35 will be described with a central axis J of the stator unit 35 running in the Z direction (the vertical direction).

Figure 2:
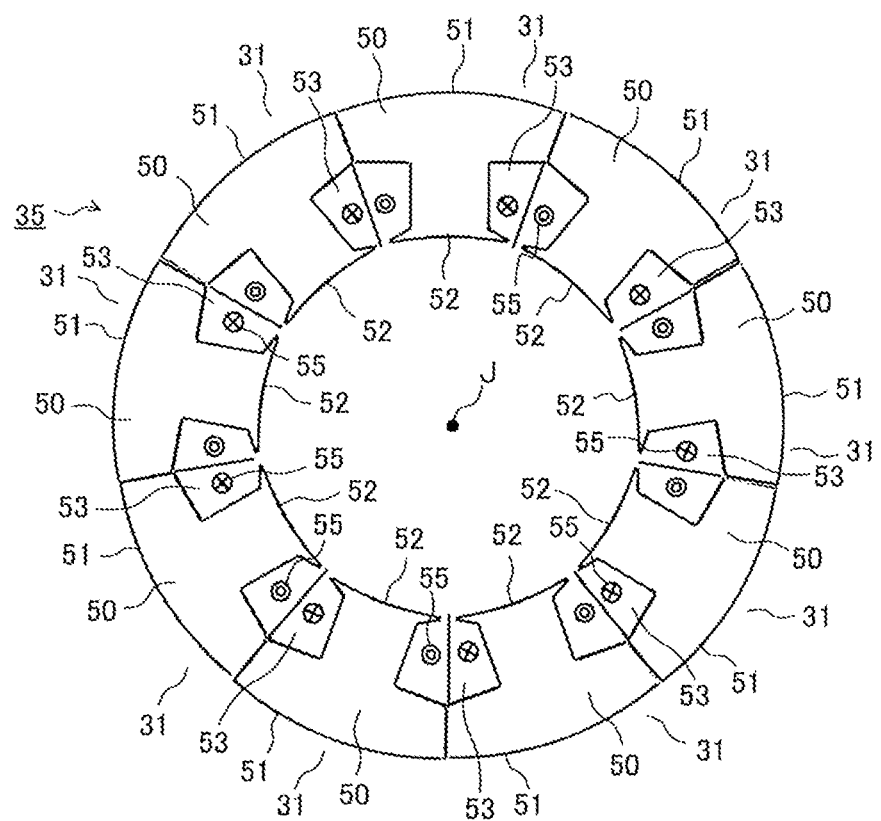
FIG. 2 is a schematic top plan view of a stator unit 35 according to Embodiment 1.
Figure 3:
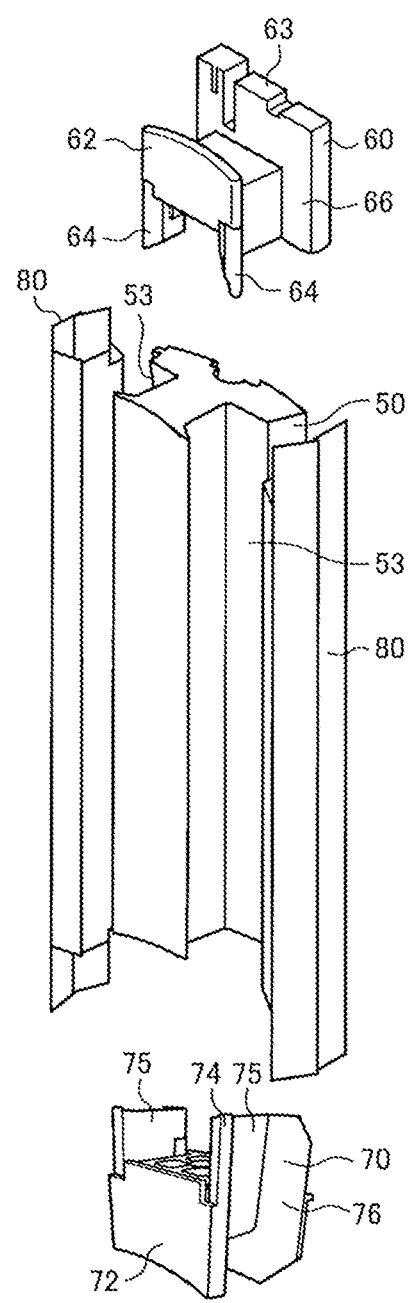
FIG. 3 is an exploded perspective view of a stator 31 according to Embodiment 1.
Figure 4:
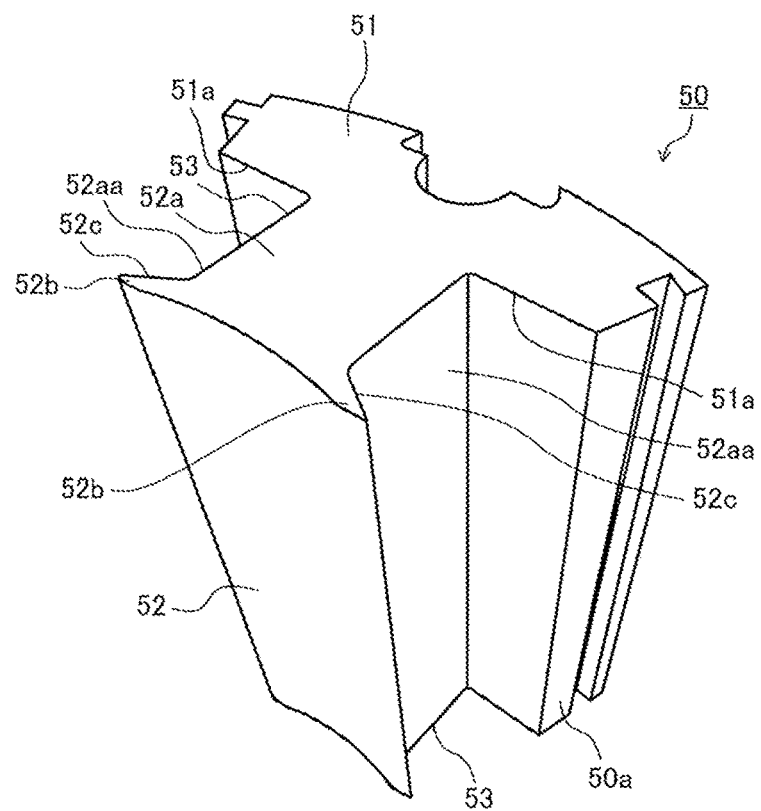
FIG. 4 is a perspective view of an iron core 50 according to Embodiment 1.

FIG. 2 is a schematic top plan view of the stator unit 35 according to Embodiment 1, Note that the illustration of an upper insulating member 60 is omitted in FIG. 2. FIG. 3 is an exploded perspective view of the stator 31 according to Embodiment 1. Note that the illustration of a winding 55 is omitted in FIG. 3. FIG. 4 is a perspective view of an iron core 50 according to Embodiment 1. Note that, when positional relationships and directions used below are described, an "axial direction", a "circumferential direction", a "radial direction", an "inner circumferential side", an "outer circumferential side", an "inner circumferential surface 63a", and an "outer circumferential surface" are respectively referred to as the "axial direction", the "circumferential direction", the "radial direction", the "inner circumferential side", the "outer circumferential side", the "inner circumferential surface", and the "outer circumferential surface" of the stator unit 35.

As FIGS. 2 and 3 illustrate, the stator unit 35 is configured by coupling plural stators 31 to one another into an annular shape. Each of the stators 31 has the iron core 50 that is a core, the winding 55 wound around the iron core 50 in a concentrated manner, the upper insulating member 60, a lower insulating member 70, and two insulating films 80.

The iron core 50 is configured by layering plural iron plates each made of a magnetic material. As FIGS. 3 and 4 illustrate, the iron core 50 has a substantially T shape in plan view and is constituted by an arc-shaped core-back portion 51 constituting an outer circumferential portion and a tooth portion 52 protruding from the core-back portion 51 in the axial direction of the stator unit 35. Furthermore, the tooth portion 52 is constituted by a tooth base 52a protruding from a central portion of the core-back portion 51 toward the inner circumferential side and paired tooth tip portions 52b protruding in the circumferential direction from a distal end portion of the tooth base 52a. The tooth base 52a is a portion around which the winding 55 is wound with the upper insulating member 60, the lower insulating member 70, and the insulating films 80 interposed therebetween. In addition, slot portions 53 in which the winding 55 is disposed are formed between the iron core 50 and the iron cores 50 of the adjacent stators 31.

The insulating films 80 are disposed along the inner wall of the slot portion 53 between the iron cores 50. The inner wall of a half portion of the slot portion 53 is constituted by an inner circumferential surface 51a of the core-back portion 51, a side surface 52aa, in the circumferential direction, of the tooth base 52a, and an outer circumferential surface 52c of the tooth tip portion 52b. The length of the insulating film 80 in a direction orthogonal to the axial direction is longer than the length, in the same direction, of the inner wall of the half portion of the slot portion 53, and portions of the insulating film 80 that are positioned outside the inner wall of the half portion of the slot portion 53 are to be folded as FIG. 3 illustrates. Thus, the insulating film 80 has a hollow structure, and the winding 55 is disposed in such a space.

The upper insulating member 60 is attached to the upper end portion, in the axial direction, of the iron core 50. The lower insulating member 70 is attached to the lower end portion, in the axial direction, of the iron core 50. The upper insulating member 60 and the lower insulating member 70 are fixed to the iron core 50 in a manner such that the upper insulating member 60 and the lower insulating member 70 hold the insulating films 80 between the upper insulating member 60 and the iron core 50 and between the lower insulating member 70 and the iron core 50.

The windings 55 are connected to wires via connection terminals provided at the upper insulating members 60 and connected to power supply terminals of U, V, and W phases. In addition, the U, V, and W phases are electrically connected to one another via jumper wires.

The core-back portions 51 of the iron cores 50 of the stators 31 configured as described above are coupled to one another in the circumferential direction, thereby being joined to one another into an annular shape, and the stator unit 35 thus has a cylindrical shape. The stator unit 35 is accommodated in the pressure container 40 with the central axis J of the cylindrical shape running in the Z direction (the vertical direction).

Hereinafter, details of each constituent component constituting the stator 31 will be described.

[Upper Insulating Member 60]

Figure 5:
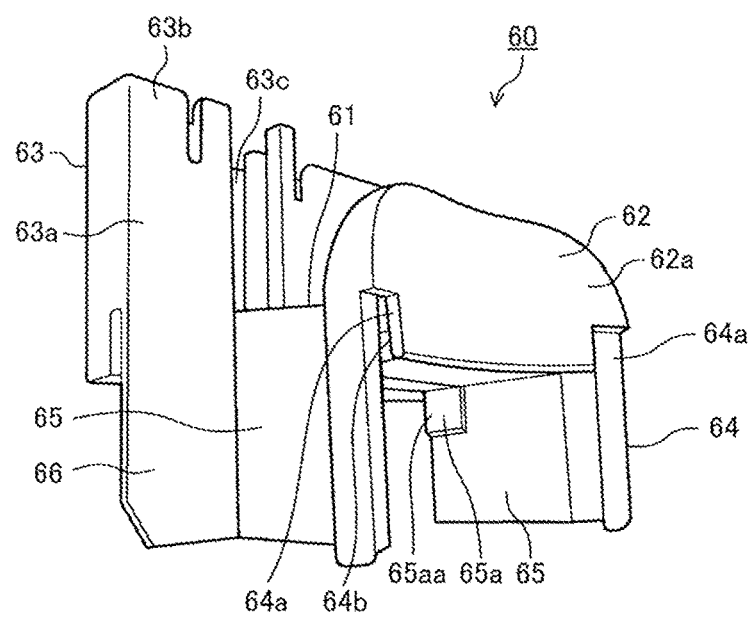
FIG. 5 is a perspective view of an upper insulating member 60 according to Embodiment 1.
Figure 6:
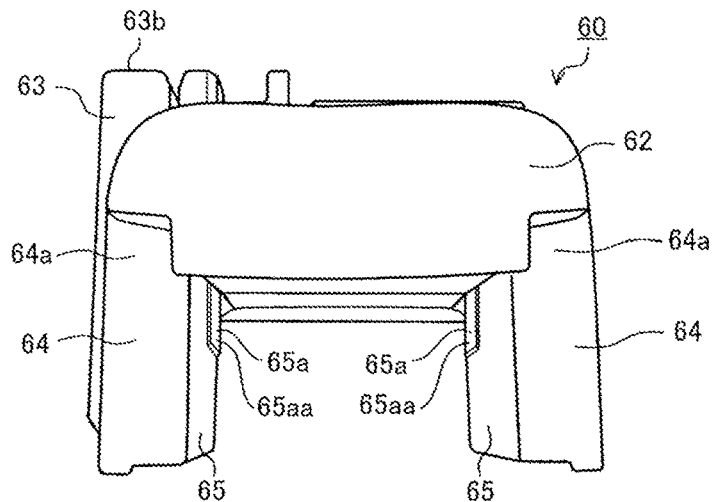
FIG. 6 is a perspective view of the upper insulating member 60 according to Embodiment 1 as viewed from the inner circumferential surface side of the stator unit 35.
Figure 7:
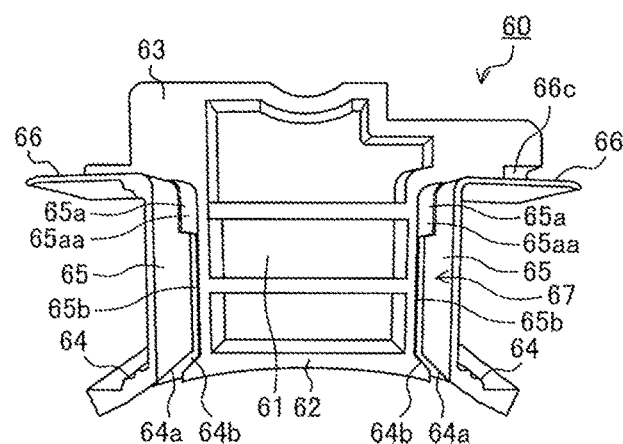
FIG. 7 illustrates the upper insulating member 60 according to Embodiment 1 as viewed from the iron core 50 side.
Figure 8:
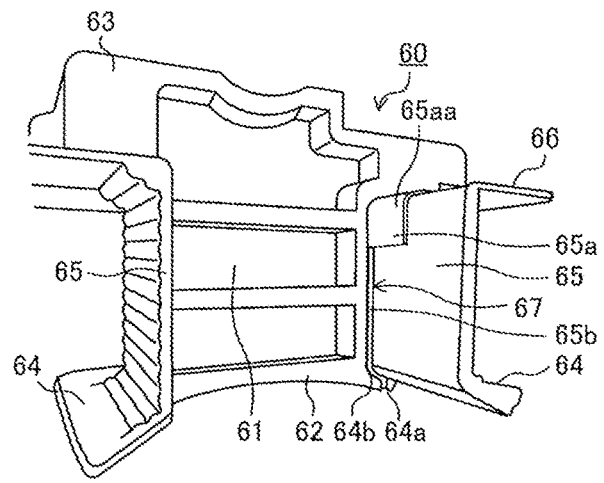
FIG. 8 illustrates the upper insulating member 60 according to Embodiment 1 as viewed from the iron core 50 side.
Figure 9:
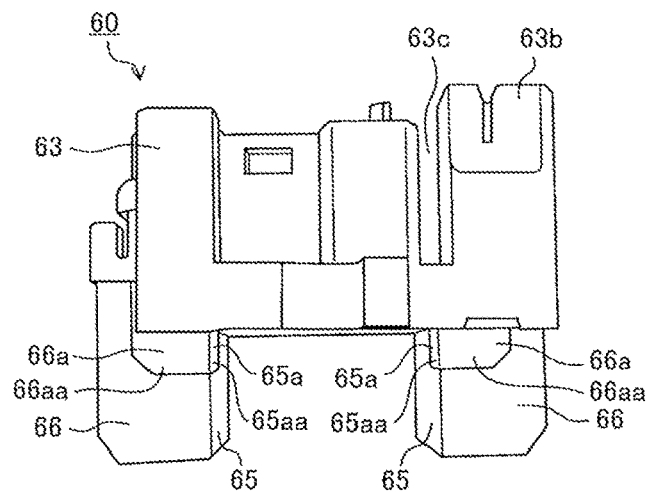
FIG. 9 illustrates the upper insulating member 60 according to Embodiment 1 as viewed from the outer circumferential surface side of the stator unit 35.

FIG. 5 is a perspective view of the upper insulating member 60 according to Embodiment 1. FIG. 6 is a perspective view of the upper insulating member 60 according to Embodiment 1 as viewed from the inner circumferential surface side of the stator unit 35. FIG. 7 illustrates the upper insulating member 60 according to Embodiment 1 as viewed from the iron core 50 side. FIG. 8 illustrates the upper insulating member 60 according to Embodiment 1 as viewed from the iron core 50 side, and FIG. 8 is a perspective view as viewed at an angle different from the angle at which the upper insulating member 60 is viewed in FIG. 7. FIG. 9 illustrates the upper insulating member 60 according to Embodiment 1 as viewed from the outer circumferential surface side of the stator unit 35.

The upper insulating member 60 is disposed on the top of the iron core 50. The upper insulating member 60 is made of, for example, polybutylene terephthalate (PBT) so as to insulate the winding 55 and the iron core 50 from one another.

The upper insulating member 60 has a central base portion 61 covering an end portion, in the axial direction, of the tooth base 52a, an outer circumferential wall portion 63 formed on the outer circumferential side relative to the central base portion 61, and an inner circumferential wall portion 62 formed on the inner circumferential side relative to the central base portion 61. The central base portion 61 has paired central legs 65 extending downward in the axial direction from both sides, in the circumferential direction, of the central base portion 61 toward the slot portions 53.

The outer circumferential wall portion 63 protrudes from an outer-circumferential-side end portion of the central base portion 61 toward both sides in the circumferential direction and extends upward in the axial direction. On the lower side of the outer circumferential wall portion 63, there is formed paired outer circumferential legs 66 extending downward in the axial direction from both sides, in the circumferential direction, of the outer circumferential wall portion 63 toward the slot portions 53. An upper portion of the inner circumferential surface 63a of the outer circumferential wall portion 63 has a slot 63b in which a connection terminal (not illustrated) is press-fitted and a wire groove 63c in which a wire is disposed.

The inner circumferential wall portion 62 protrudes from an inner-circumferential-side end portion of the central base portion 61 toward both sides in the circumferential direction and extends upward in the axial direction. On the lower side of the inner circumferential wall portion 62, there is formed paired inner circumferential legs 64 extending downward in the axial direction from both sides, in the circumferential direction, of the inner circumferential wall portion 62 toward the slot portions 53.

The upper insulating member 60 has position fixing portions 65a that are engaged with the iron core 50 to fix the position of the upper insulating member 60. The position fixing portions 65a are provided at proximal ends of the paired central legs 65 and constituted by paired thick-walled portions 65aa that are formed by proximal end portions being thickened toward the iron core 50, that is, inwardly thickened. The paired thick-walled portions 65aa have mutually facing surfaces that are in contact with the side surfaces 52aa, in the circumferential direction, of the tooth base 52a of the iron core 50 when the upper insulating member 60 is disposed on the upper end portion, in the axial direction, of the iron core 50, That is, the upper insulating member 60 is fixed to the iron core 50 by the paired thick-walled portions 65aa holding the tooth base 52a of the iron core 50, therebetween, from both sides in the circumferential direction.

Each of the paired thick-walled portions 65aa has a wall thickness equal to or slightly larger than the thickness of the insulating film 80. Thus, between the upper insulating member 60 fixed to the iron core 50 and the tooth base 52a of the iron core 50, there are gaps each having a thickness similar or equal to the wall thickness of the paired thick-walled portions 65aa, that is, gaps sufficient for insertion of the insulating films 80. Note that, here, the paired thick-walled portions 65aa are formed at the proximal ends of the paired central legs 65 and positioned on the outer circumferential side, that is, on the outer side in the radial direction; however, the positions of the thick-walled portions 65aa are not limited to such positions.

In addition, the upper insulating member 60 has positioning portions 66a that position the upper insulating member 60 in the radial direction in relation to the iron core 50. As FIG. 9 illustrates, the positioning portions 66a are provided on the outer circumferential surfaces, on the outer side in the radial direction, of the paired outer circumferential legs 66 and positioned at proximal ends of the paired outer circumferential leas 66. The positioning portions 66a are constituted by paired thick portions 66aa that are formed by proximal end portions of the paired outer circumferential legs 66 being thickened outward in the radial direction. Each of the paired thick portions 66aa has a wall thickness slightly larger than or equal to the thickness of the insulating film 80. The upper insulating member 60 is fixed to the iron core 50 so that outer circumferential surfaces of the paired thick portions 66aa are in contact with the core-back portion 51, and, between the upper insulating member 60 and the core-back portion 51 of the iron core 50, there are gaps each having a thickness similar or equal to the wall thickness of the paired thick portions 66aa, that is, gaps sufficient for insertion of the insulating films 80. The paired thick-walled portions 65aa constituting the positioning portions 66a and the paired thick portions 66aa constituting the position fixing portions 65a are continuously formed.

In addition, the upper insulating member 60 has insertion recesses 67 into which the upper end portions, in the axial direction, of the insulating films 80 are inserted. As FIG. 7 illustrates, each of the insertion recesses 67 has a first recess 64a, a second recess 64b, and a third recess 65b. As FIG. 5 illustrates, the first recesses 64a are cutouts formed at bottoms of both circumferential-direction end portions of the inner circumferential wall portion 62. As FIGS. 7 and 8 illustrate, the second recesses 64b are grooves formed in portions, on the iron core 50 side, of the proximal end portions of the paired inner circumferential legs 64. The third recesses 65b are grooves formed in portions, on the iron core 50 side, of the proximal end portions of the paired central legs 65. The first recess 64a, the second recess 64b, and the third recess 65b communicate with one another.

[Lower Insulating Member 70]

Figure 10:
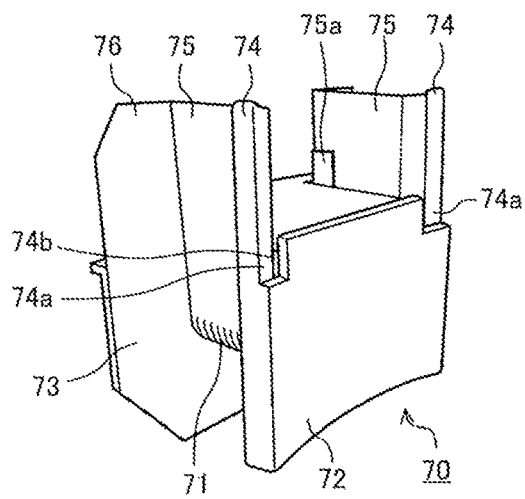
FIG. 10 is a perspective view of a lower insulating member 70 according to Embodiment 1.
Figure 11:
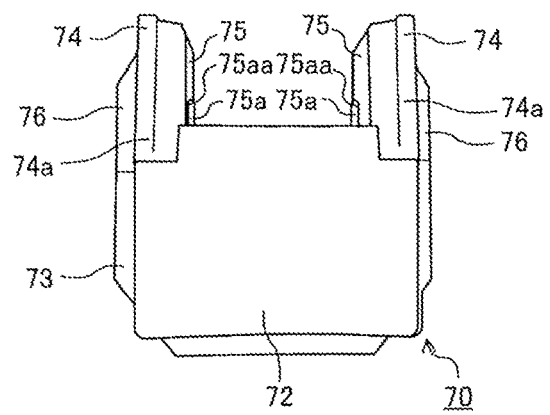
FIG. 11 is a perspective view of the lower insulating member 70 according to Embodiment 1 as viewed from the inner circumferential surface side of the stator unit 35.
Figure 12:
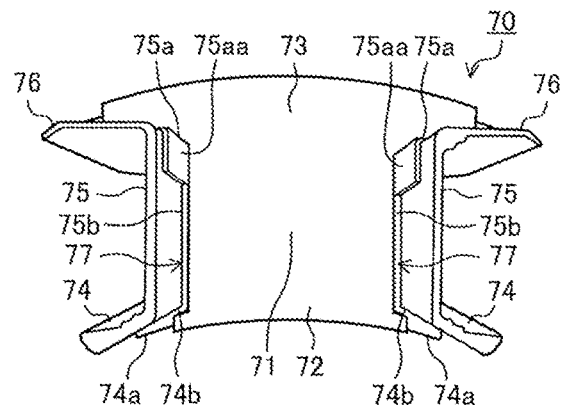
FIG. 12 illustrates the lower insulating member 70 according to Embodiment 1 as viewed from the iron core 50 side.
Figure 13:
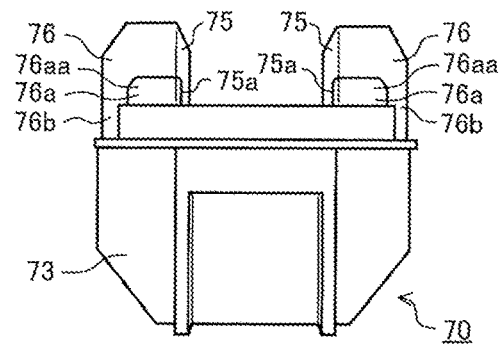
FIG. 13 is a perspective view of the lower insulating member 70 according to Embodiment 1 as viewed from the outer circumferential surface side of the stator unit 35.

FIG. 10 is a perspective view of the lower insulating member 70 according to Embodiment 1. FIG. 11 is a perspective view of the lower insulating member 70 according to Embodiment 1 as viewed from the inner circumferential surface side of the stator unit 35. FIG. 12 illustrates the lower insulating member 70 according to Embodiment 1 as viewed from the iron core 50 side. FIG. 13 is a perspective view of the lower insulating member 70 according to Embodiment 1 as viewed from the outer circumferential surface side of the stator unit 35.

The lower insulating member 70 has substantially the same configuration as the configuration of the upper insulating member 60 and has at least all the above-described structures of the upper insulating member 60. Thus, in FIGS. 10 to 13, the same constituent portions as the constituent portions of the upper insulating member 60 are denoted by references whose second digit number is "7" that is changed from the second digit number "6" of the references denoting the constituent portions of the upper insulating member 60, and descriptions of the same constituent portions will be omitted.

[Insulating Film 80]

Figure 14:
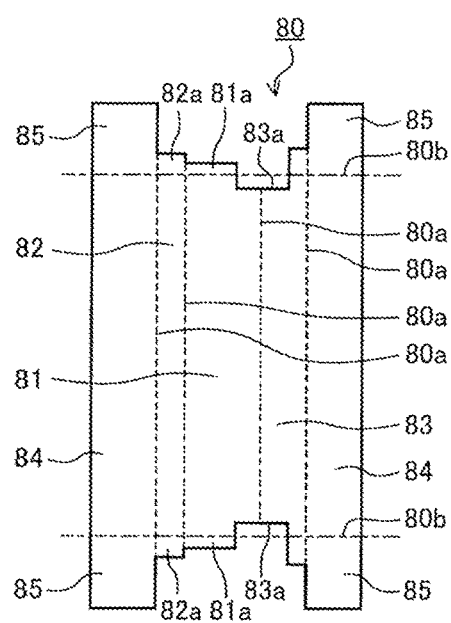
FIG. 14 illustrates an unfolded insulating film 80 according to Embodiment 1.

FIG. 14 illustrates the unfolded insulating film 80 according to Embodiment 1.

The insulating film 80 is constituted by a substantially rectangular thin film. The insulating film 80 is made of, for example, polyethylene terephthalate (PET) so as to insulate the winding 55 and the iron core 50 from one another. The insulating films 80 are held and fixed between the upper insulating member 60 and the iron core 50 and between the lower insulating member 70 and the iron core 50.

The insulating film 80 has a central film portion 81 that is in contact with the side surface 52aa of the tooth base 52a of the iron core 50, an inner circumferential film portion 82 that is in contact with the outer circumferential surface 52c of the tooth tip portion 52b, an outer circumferential film portion 83 that is in contact with the inner circumferential surface 51a of the core-back portion 51, and portions 84 that are portions other than the film portions 81 to 83. In FIG. 14, the dotted lines are folds 80a provided on boundaries between the film portions. When being mounted on the iron core 50, the insulating film 80 is folded at each fold 80a and used in a hollow shape as FIG. 3 illustrates.

The rotation of the rotor 32 causes a component such as a bearing of the compressor 100 to slide, and metallic components rub against one another, thereby generating metallic foreign materials such as abrasion powder. Such metallic foreign materials that are mixed in refrigerant and oil and fall down onto the entire stator 31 are attracted to the inner side, in the radial direction, of the iron core 50 by the magnetic force of the rotor 32. Thus, in Embodiment 1, in a portion of the insulating film 80 that is in contact with the inner wall of the slot portion 53 of the iron core 50, at least a portion on the inner side in the radial direction has a length in the axial direction longer than the length of the iron core 50 in the axial direction, to increase the insulation performance of such an inner side region, in the radial direction, of the iron core 50. Hereinafter, specific configurations will be described.

In FIG. 14, two dot-and-dash lines 80b drawn laterally represent the positions of both end surfaces, in the axial direction, of the iron core 50, with the insulating film 80 being mounted on the iron core 50. The central film portion 81 has central protrusions 81a protruding, in the axial direction, to the upper side and the lower side relative to the iron core 50. The inner circumferential film portion 82 has inner circumferential protrusions 82a protruding more than the central protrusions 81a of the central film portion 81. The length, in the axial direction, of each of the central protrusions 81a and the inner circumferential protrusions 82a is, for example, 0.15 mm or more. That is, the central protrusions 81a and the inner circumferential protrusions 82a protrude, for example, 0.15 mm or more from the iron core 50.

The metallic foreign materials tend to be adhered to the tooth tip portion 52b. Thus, at least a portion of the insulating film 80 that is in contact with the outer circumferential surface 52c of the tooth tip portion 52b may have a length in the axial direction longer than the length of the iron core 50 in the axial direction. Here, in addition to such a portion that is in contact with the outer circumferential surface 52c of the tooth tip portion 52b, in the central film portion 81 of the insulating film 80 that is in contact with the side surface 52aa of the tooth base 52a, the length of a portion on the tooth tip portion 52b side is also elongated.

In addition, here, the inner circumferential protrusion 82a has a length in the axial direction longer than the length, in the axial direction, of the central protrusion 81a. Thus, the insulation performance is increased compared with the case where the inner circumferential protrusion 82a has a length in the axial direction equal to the length of the central protrusion 81a in the axial direction. However, in the axial direction, the length of the inner circumferential protrusion 82a and the length of the central protrusion 81a may be equal to one another as long as the inner circumferential protrusion 82a and the central protrusion 81a protrude more than the iron core 50.

As described above, the portion of the insulating film 80 that is in contact with the tooth tip portion 52b and the portion of the insulating film 80 that is in contact with the portion of the tooth base 52a on the tooth tip portion 52b side have lengths in the axial direction longer than the length of the iron core 50 in the axial direction. Thus, it is possible to prevent the insulation performance from being decreased by the metallic foreign materials.

In the insulating film 80, a recessed cutout 83a is formed at each of both axial-direction edges of the central film portion 81 and the outer circumferential film portion 83. The cutout 83a is provided so as to prevent the insulating film 80 from interfering with the position fixing portion 65a and the positioning portion 66a of the upper insulating member 60.

Figure 17:
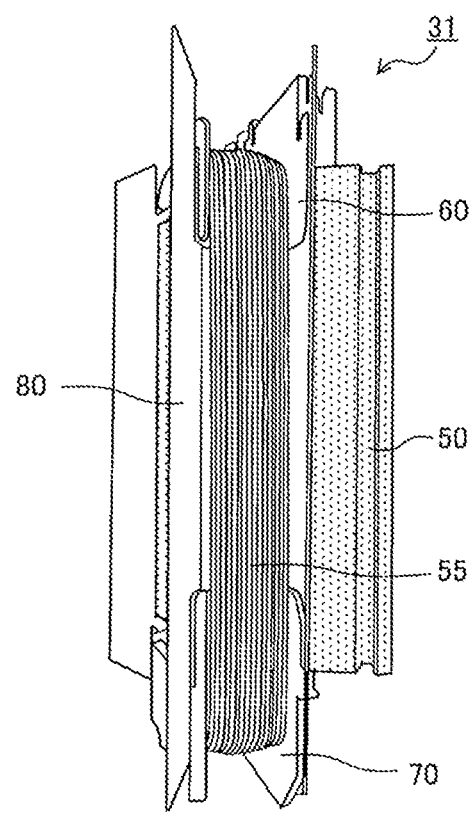
FIG. 17 is a perspective view of the stator 31 according to Embodiment 1, with a winding 55 being wound over the stator 31.

In addition, at the four corners of the insulating film 80, protruding portions 85 are formed. As FIG. 17 illustrates, which will be referred to later, the protruding portions 85 are provided so that the insulating film 80 rises to a position above the winding 55 to prevent the winding 55 from coming into contact with the winding 55 of the adjacent stator 31.

Figure 15:
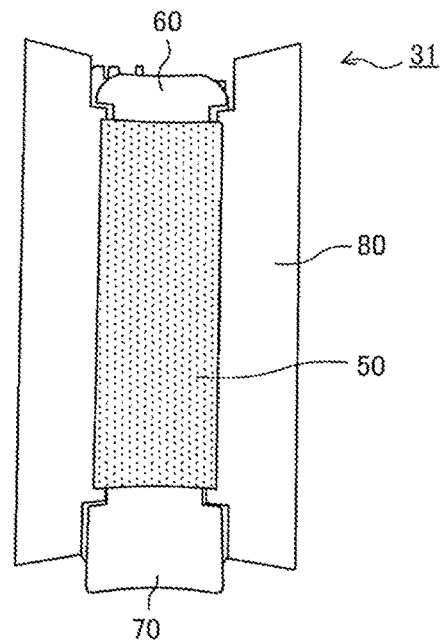
FIG. 15 illustrates the stator 31 according to Embodiment 1 as viewed from the inner circumferential surface side of the stator unit 35.
Figure 16:
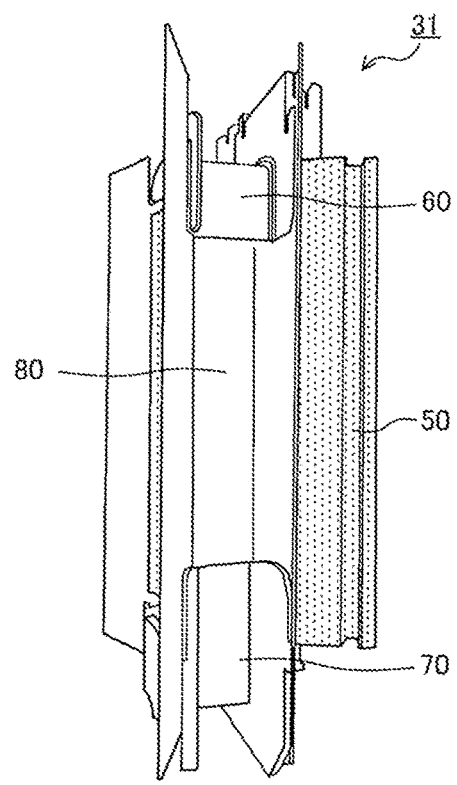
FIG. 16 is a perspective view of the stator 31 according to Embodiment 1 as viewed from the circumferential-direction end portion side of the stator 31.
Figure 18:
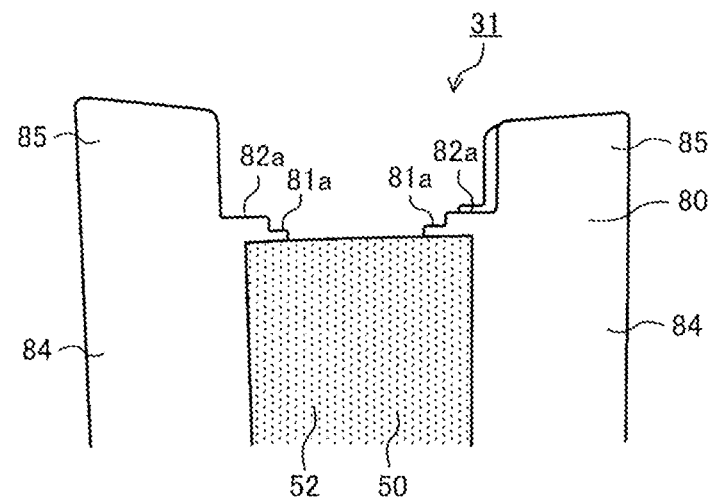
FIG. 18 illustrates the stator 31, without the upper insulating member 60, according to Embodiment 1 as viewed from the inner circumferential side.
Figure 19:
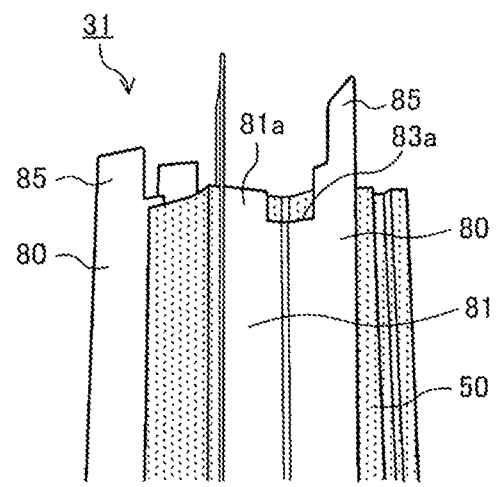
FIG. 19 is a perspective view of the stator 31, without the upper insulating member 60, according to Embodiment 1.
Figure 20:
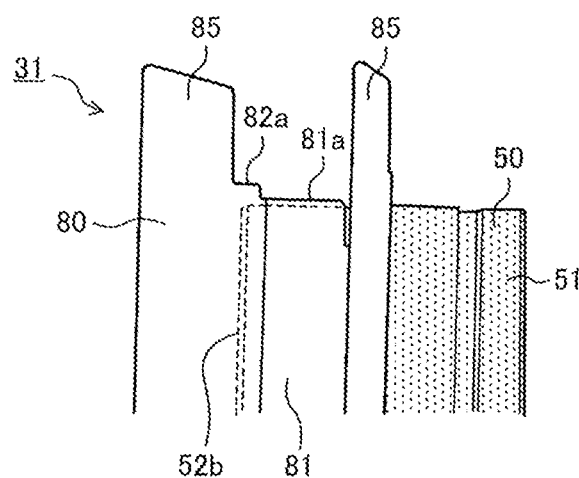
FIG. 20 illustrates the stator 31, without the upper insulating member 60, according to Embodiment 1 as viewed from the circumferential-direction end portion side of the stator 31.

FIG. 15 illustrates the stator 31 according to Embodiment 1 as viewed from the inner circumferential surface side of the stator unit 35. FIG. 16 is a perspective view of the stator 31 according to Embodiment 1 as viewed from the circumferential-direction end portion side of the stator 31. FIG. 17 is a perspective view of the stator 31 according to Embodiment 1, with the winding 55 being wound over the stator 31. FIG. 18 illustrates the stator 31, without the upper insulating member 60, according to Embodiment 1 as viewed from the inner circumferential side. FIG. 19 is a perspective view of the stator 31, without the upper insulating member 60, according to Embodiment 1. FIG. 20 illustrates the stator 31, without the upper insulating member 60, according to Embodiment 1 as viewed from the circumferential-direction end portion side of the stator 31.

An assembly procedure of attaching the upper insulating member 60 and the insulating films 80 to the iron core 50 will be described with reference to FIGS. 15 to 20.

First, the upper insulating member 60 is attached to the iron core 50. Specifically, the upper insulating member 60 is placed on the iron core 50 from above, the paired thick-walled portions 65aa of the position fixing portions 65a hold the tooth base 52a therebetween, and the upper insulating member 60 is thereby fixed to the iron core 50. At this time, the upper insulating member 60 itself is pushed to the outer circumferential side, and the paired thick portions 66aa of the positioning portions 66a of the upper insulating member 60 thereby come into contact with the inner circumferential surfaces 51a of the core-back portion 51, thereby positioning the upper insulating member 60 in the radial direction in relation to the iron core 50.

The insulating films 80 are inserted into the gaps between the iron core 50 and the upper insulating member 60 fixed to the iron core 50 as described above. The insulating films 80 that have been folded at the folds 80a illustrated in FIG. 14 are inserted. Note that such insertion is easily performed when the folds 80a are provided; however, the folds 80a are not necessarily provided.

The insulating films 80 are fixed by being held between the iron core 50 and the paired inner circumferential legs 64 of the upper insulating member 60, the paired central legs 65 of the upper insulating member 60, and the paired outer circumferential legs 66 of the upper insulating member 60. The upper end portion of each of the insulating films 80 in the axial direction is accommodated in the insertion recess 67. The upper end portion of the insulating film 80 in the axial direction has the cutout 83a for preventing the insulating film 80 from interfering with the position fixing portion 65a and the positioning portion 66a. Thus, while the upper end portion is accommodated in the insertion recess 67, the insulating film 80 can be inserted into the gap between the upper insulating member 60 and the iron core 50 without interfering with the position fixing portion 65a and the positioning portion 66a.

Here, if the upper insulating member 60 has no position fixing portions 65a, during assembly, the upper insulating member 60 only sits on the upper end portion of the iron core 50 and is not fixed to the iron core 50. Thus, the upper insulating member 60 can freely move relative the iron core 50. Accordingly, when being inserted into the gap between the upper insulating member 60 and the iron core 50, the insulating film 80 pushes the upper insulating member 60 away to cause the upper insulating member 60 to be detached from the iron core 50, and the ease of assembly is thereby decreased. In contrast, in Embodiment 1, the upper insulating member 60 is fixed to the iron core 50 by the position fixing portions 65a, and the upper insulating member 60 is thereby suppressed from causing an inconvenience of being detached from the iron core 50 during the assembly. Thus, the ease of assembly can be improved.

After the upper insulating member 60 and the insulating films 80 are attached to the iron core 50 as described above, the lower insulating member 70 is attached to the iron core 50. Note that, here, a method in which the upper insulating member 60 is attached to the iron core 50 before the attachment of the lower insulating member 70 is described; however, such attachment may also be performed in inverse order. When the lower insulating member 70 is attached to the iron core 50 first, the insulating films 80 may be installed after the lower insulating member 70 is fixed to the iron core 50 by using position fixing portions 75a of the lower insulating member 70, and the upper insulating member 60 may be fixed to the iron core 50.

Advantageous Effects

Advantageous effects of Embodiment 1 will be described below. Hereinafter, each of the upper insulating member 60 and the lower insulating member 70 is referred to as an "insulating member". The reference for the upper insulating member 60 will be used as the reference for the "insulating member" below. The same applies to Embodiment 2, which will be described later.

As described above, the motor according to Embodiment 1 is a motor having the stator unit 35 formed by coupling the plural stators 31 to one another into an annular shape. Each of the stators 31 has: the iron core 50 having the arc-shaped core-back portion 51 and the tooth portion 52 protruding from the core-back portion 51, the iron core 50 forming the slot portions 53 between the iron core 50 and adjacent ones of the stators 31; the insulating members 60 disposed on both the end portions, in the axial direction, of the iron core 50; the insulating films 80 disposed so as to be in contact with the inner walls of the slot portions 53 of the iron core 50; and the winding 55 disposed in the slot portions 53 and wound over the iron core 50 with the insulating members 60 and the insulating films 80 interposed therebetween. The tooth portion 52 of the iron core 50 has the tooth base 52a protruding from the core-back portion 51 toward the inner circumferential side and the paired tooth tip portions 52b protruding in the circumferential direction from the distal end portion of the tooth base 52a. Each of the insulating films 80 is disposed while being in contact with the inner circumferential surface 51a of the core-back portion 51, the side surface 52aa, in the circumferential direction, of the tooth base 52a, and the outer circumferential surface 52c of the tooth tip portion 52b that are part of the inner wall of the slot portion 53. At least the portion of the insulating film 80 that is in contact with the outer circumferential surface 52c of the tooth tip portion 52b has a length in the axial direction longer than the length of the iron core 50 in the axial direction. Each of the insulating members 60 has the position fixing portions 65a that are engaged with the iron core 50 to fix the position of the insulating member 60.

As described above, in the portion of the insulating film 80 that is in contact with the inner wall of the slot portion 53, at least a portion on the side of the central axis J of the stator unit 35 has a length in the axial direction longer than the length of the iron core 50 in the axial direction. Thus, the metallic foreign materials that are attracted to the central axis J of the stator unit 35 can be suppressed from being adhered to the iron core 50, and the insulation between the winding 55 and the iron core 50 can thereby be ensured. In addition, the insulating member 60 has the position fixing portions 65a that fixes the position of the insulating member 60 by being engaged with the iron core 50, thereby being suppressed from causing the inconvenience of being detached from the iron core 50 during the assembly. Thus, the ease of assembly can be improved.

According to Embodiment 1, in the insulating film 80, the portion that is in contact with the outer circumferential surface 52c of the tooth tip portion 52b and the portion that is in contact with the portion being part of the side surface 52aa, in the circumferential direction, of the tooth base 52a and positioned beside the tooth tip portion 52b have lengths in the axial direction longer than the length of the iron core 50 in the axial direction. The portion that is in contact with the tooth tip portion 52b has a length in the axial direction longer than the length, in the axial direction, of the portion that is in contact with the portion being part of the side surface 52aa, in the circumferential direction, of the tooth base 52a and positioned beside the tooth tip portion 52b.

Thus, the insulation performance of the tooth tip portion 52b to which the metallic foreign materials tend to be adhered can further be increased.

According to Embodiment 1, the insulating member 60 has the central base portion 61 covering the end portion, in the axial direction, of the tooth base 52a, and the central base portion 61 has the paired central legs 65 extending in the axial direction from both sides, in the circumferential direction, of the central base portion 61 toward the slot portions 53. The position fixing portions 65a are the paired thick portions 66aa formed on the paired central legs 65 and inwardly thickened, and the position fixing portions 65a fix the position of the insulating member 60 by the paired thick portions 66aa holding the tooth base 52a, therebetween, from both sides in the circumferential direction.

As described above, the position fixing portions 65a can be constituted by the paired thick-walled portions 65aa and can fix the position of the insulating member 60 by the paired thick-walled portions 65aa holding the tooth base 52a, therebetween, from both sides in the circumferential direction.

According to Embodiment 1, the insulating film 80 has the cutouts 83a for preventing the insulating film 80 from interfering with the position fixing portions 65a.

As described above, the insulating film 80 can be prevented from interfering with the position fixing portions 65a by having the cutouts 83a.

According to Embodiment 1, the insulating member 60 further has the inner circumferential wall portion 62 formed on the inner circumferential side relative to the tooth base 52a, and the inner circumferential wall portion 62 has the paired inner circumferential legs 64 extending in the axial direction from both sides, in the circumferential direction, of the inner circumferential wall portion 62 toward the slot portions 53. The insulating member 60 has the insertion recesses 67 into which the end portions, in the axial direction, of the insulating films 80 are inserted, and each of the insertion recesses 67 is constituted by the first recess 64a formed in the inner circumferential wall portion 62, the second recess 64b formed at the proximal end of one of the paired inner circumferential legs 64, and the third recess 65b formed at the proximal end of one of the paired central legs 65.

The end portion of the insulating film 80 in the axial direction can be inserted into the insertion recess 67 configured as described above.

According to Embodiment 1, the insulating member 60 has the outer circumferential wall portion 63 formed on the outer circumferential side relative to the tooth base 52a. The outer circumferential wall portion 63 has the paired outer circumferential legs 66 extending in the axial direction from both sides, in the circumferential direction, of the outer circumferential wall portion 63 toward the slot portions 53. The paired outer circumferential legs 66 have the positioning portions 66a that position the insulating member 60 in the radial direction in relation to the iron core 50. The positioning portions 66a are constituted by the paired thick portions 66aa formed on the outer circumferential surfaces, on the outer side in a radial direction, of the paired outer circumferential legs 66.

As described above, the ease of assembly can further be improved by the positioning portions 66a being provided on the insulating member 60. In addition, because being constituted by the paired thick portions 66aa, the positioning portions 66a have a simple structure.

Embodiment 2

Embodiment 2 differs from Embodiment 1 in the structures of the position fixing portions of the upper insulating member 60 and the lower insulating member 70. Hereinafter, structures of Embodiment 2 differing from the structures of Embodiment 1 will mainly be described.

Figure 21:
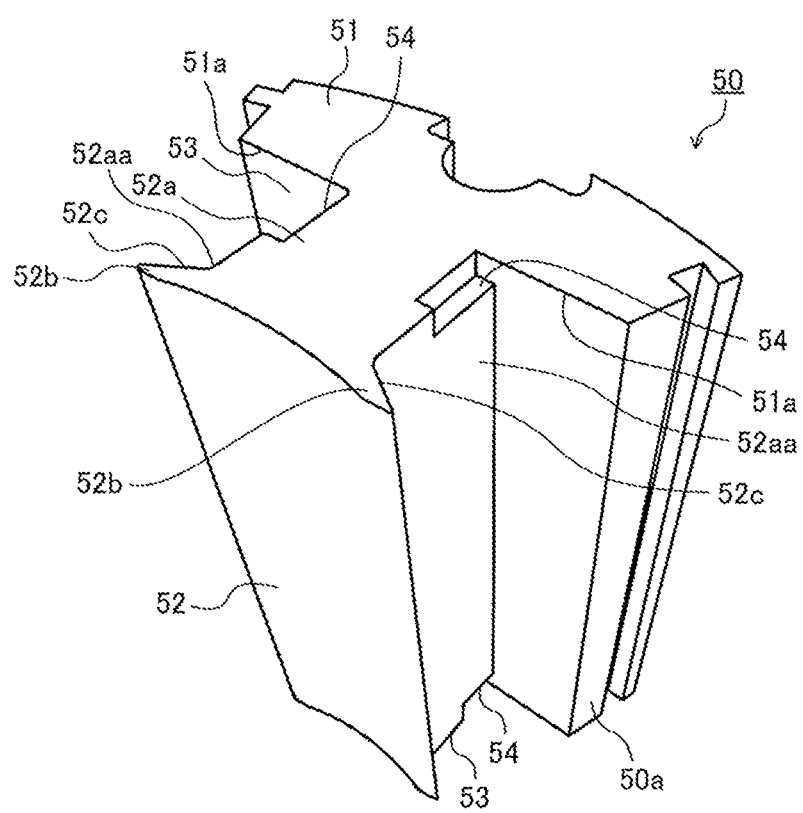
FIG. 21 is a perspective view of an iron core 50 according to Embodiment 2.
Figure 22:
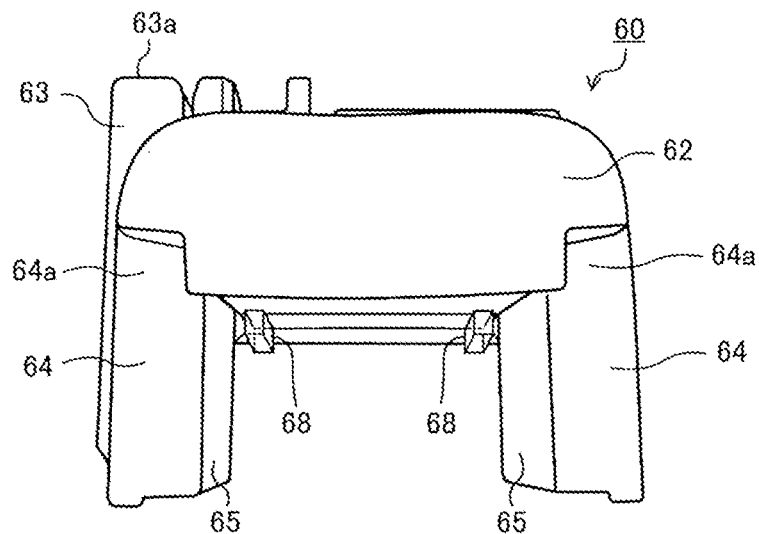
FIG. 22 is a perspective view of an upper insulating member 60 according to Embodiment 2 as viewed from the inner circumferential surface side of the stator 31.
Figure 23:
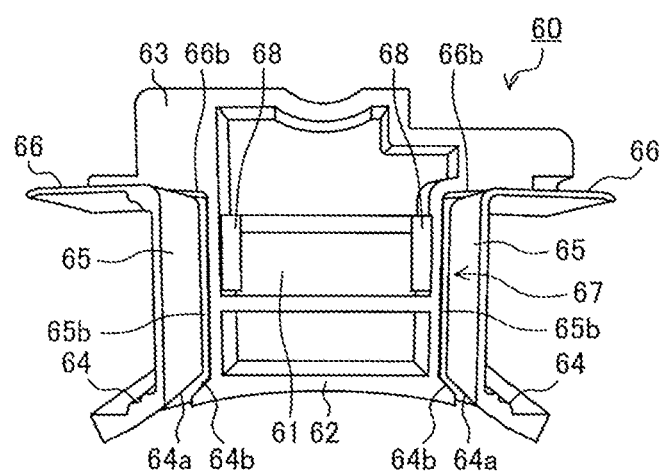
FIG. 23 illustrates the upper insulating member 60 according to Embodiment 2 as viewed from the iron core 50 side.
Figure 24:
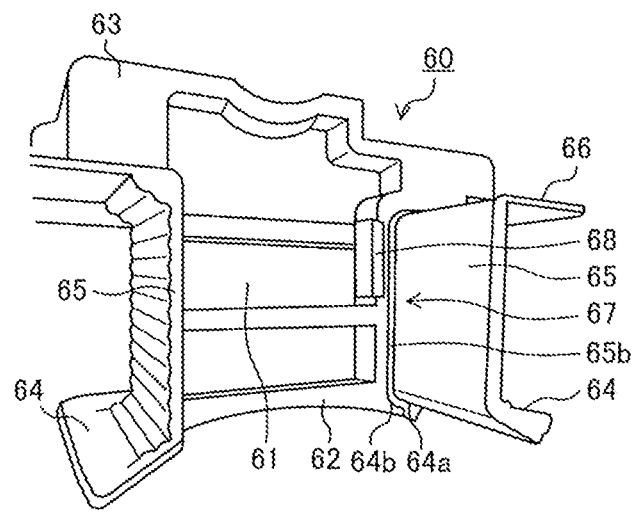
FIG. 24 is a perspective view of the upper insulating member 60 according to Embodiment 2 as viewed from the iron core 50 side.

FIG. 21 is a perspective view of an iron core 50 according to Embodiment 2. FIG. 22 is a perspective view of an upper insulating member 60 according to Embodiment 2 as viewed from the inner circumferential surface side of the stator 31. FIG. 23 illustrates the upper insulating member 60 according to Embodiment 2 as viewed from the iron core 50 side. FIG. 24 is a perspective view of the upper insulating member 60 according to Embodiment 2 as viewed from the iron core 50 side.

As FIG. 21 illustrates, in the iron core 50 according to Embodiment 2, paired recesses 54 that face away from one another in the circumferential direction are formed in each of both axial-direction end portions of the tooth base 52a and are positioned on the outer circumferential side.

In Embodiment 1 described above, the position fixing portions 65a of the upper insulating member 60 are constituted by the paired thick-walled portions 65aa. In contrast, in Embodiment 2, as FIGS. 22, 23, and 24 illustrate, position fixing portions 65a of the upper insulating member 60 are constituted by paired protrusions 68 positioned on the inner side relative to the paired central legs 65. The paired protrusions 68 protrude from a surface of the central base portion 61 on the iron core 50 side and are engaged with the paired recesses 54 of the iron core 50. That is, the upper insulating member 60 of Embodiment 2 is fixed to the iron core 50 by the paired protrusions 68 of the position fixing portions 65a being engaged with the paired recesses 54 of the iron core 50. Due to such fixation, the position of the upper insulating member 60 in the radial direction is determined; thus, the positioning portions 66a in Embodiment 1 are removed from the configuration of the Embodiment 2.

In Embodiment 2, third recesses 65b extend to the outer circumferential surface side of proximal end portions of paired central legs 65. In addition, fourth recesses 66b that communicate with the third recesses 65b on one-on-one basis are formed in the proximal end portions of the paired outer circumferential legs 66 and positioned on the outer circumferential side.

Figure 25:
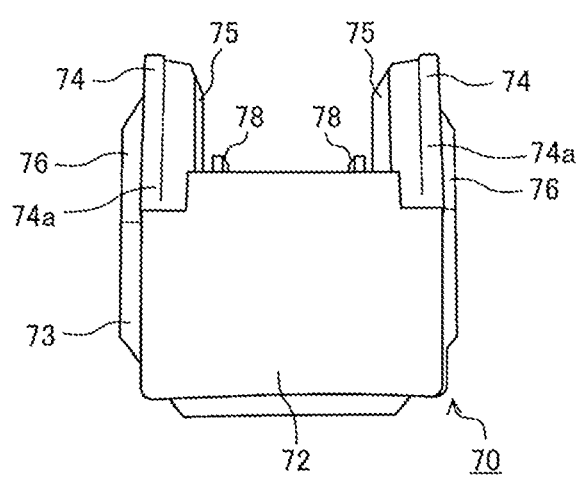
FIG. 25 is a perspective view of a lower insulating member 70 according to Embodiment 2 as viewed from the inner circumferential surface side of the stator 31.
Figure 26:
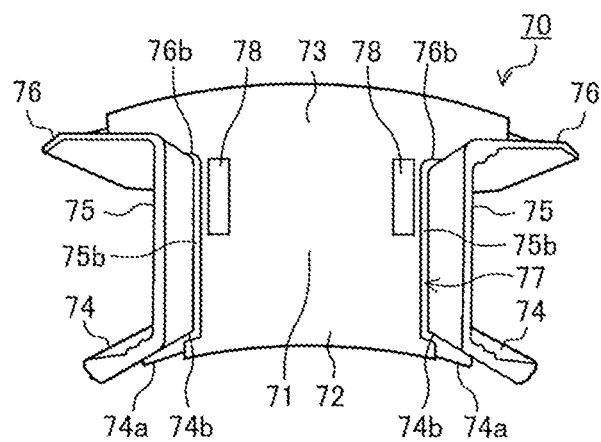
FIG. 26 illustrates the lower insulating member 70 according to Embodiment 2 as viewed from the iron core 50 side.
Figure 27:
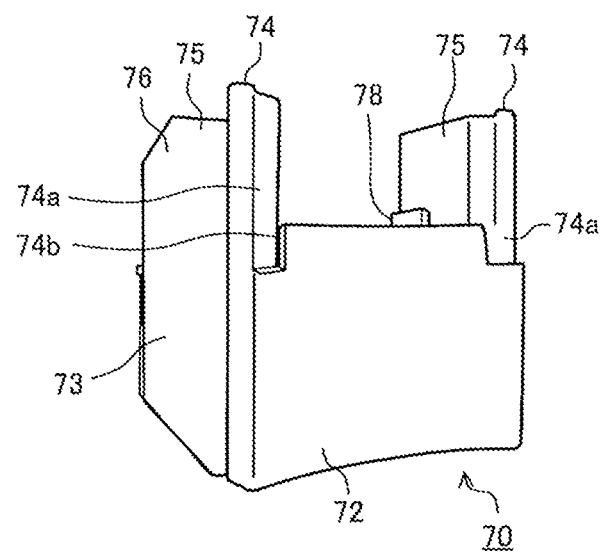
FIG. 27 is a perspective view of the lower insulating member 70 according to Embodiment 2 as viewed from the iron core 50 side.

FIG. 25 is a perspective view of a lower insulating member 70 according to Embodiment 2 as viewed from the inner circumferential surface side of the stator 31. FIG. 26 illustrates the lower insulating member 70 according to Embodiment 2 as viewed from the iron core 50 side. FIG. 27 is a perspective view of the lower insulating member 70 according to Embodiment 2 as viewed from the iron core 50 side.

The lower insulating member 70 has substantially the same configuration as the configuration of the upper insulating member 60 and has at least all the above-described structures of the upper insulating member 60. Thus, in FIGS. 25 to 27, the same constituent portions as the constituent portions of the upper insulating member 60 are denoted by references whose second digit number is "7" that is changed from the second digit number "6" of the references denoting the constituent portions of the upper insulating member 60, and descriptions of the same constituent portions will be omitted.

Figure 28:
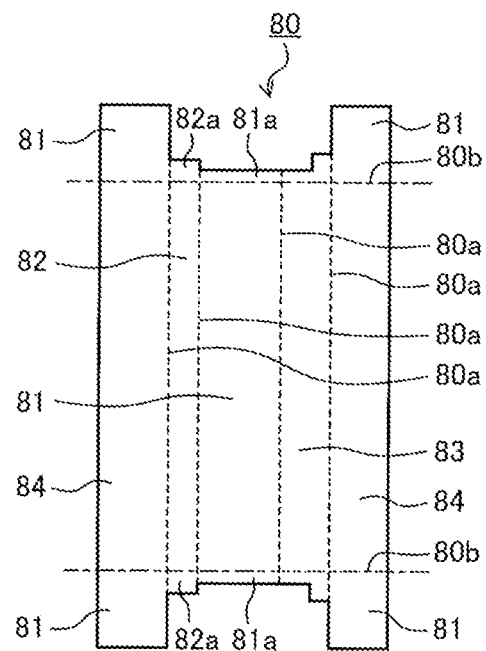
FIG. 28 illustrates an unfolded insulating film 80 according to Embodiment 2.
Figure 29:
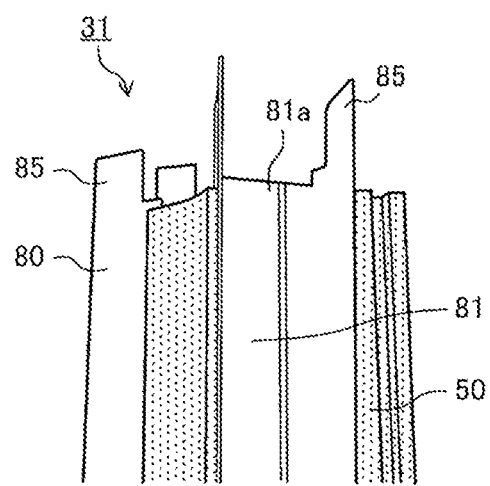
FIG. 29 is a perspective view of the stator 31, without the upper insulating member 60, according to Embodiment 2.

FIG. 28 illustrates an unfolded insulating film 80 according to Embodiment 2. FIG. 29 is a perspective view of the stator 31, without the upper insulating member 60, according to Embodiment 2.

As FIG. 28 illustrates, compared with FIG. 14 illustrating Embodiment 1, the insulating film 80 according to Embodiment 2 has no cutouts 83a, and a central protrusion 81a is provided along the entire edges of both of a central film portion 81 and an outer circumferential film portion 83 on each side. As described above, the upper insulating member 60 of Embodiment 2 is fixed to the iron core 50 by the paired protrusions 68 of the position fixing portions 65a being engaged with the paired recesses 54 of the iron core 50. Thus, the cutouts 83a, which are necessary when the position fixing portions 65a are constituted by the paired thick portions 66aa, are unnecessary for each of the insulating films 80, and the insulating films 80 can fully cover the entire inner wall of the slot portion 53 of the iron cores 50. That is, regarding each of the insulating films 80 in Embodiment 2, the length, in the axial direction, of the entire insulating film 80 is longer than the length of the iron core 50 in the axial direction.

Advantageous Effects

As described above, according to Embodiment 2, while advantageous effects similar to the advantageous effects of Embodiment 1 can be obtained, the following advantageous effects are obtained. That is, regarding a motor according to Embodiment 2, the position fixing portions 65a are constituted by the paired protrusions 68 provided on the inner side relative to the paired central legs 65. The position of the upper insulating member 60 of Embodiment 2 is fixed by the paired protrusions 68 being engaged with the paired recesses 54 provided in the tooth base 52a of the iron core 50.

Thus, compared with Embodiment 1, in Embodiment 2, it is unnecessary to provide, in the insulating film 80, cutouts 83a that are for preventing the insulating film 80 from interfering with the position fixing portions 65a. Accordingly, the insulation between the iron core 50 and the winding 55 can be improved because the entire inner wall of the slot portion 53 of the iron cores 50 can fully be covered with the insulating films 80.

REFERENCE SIGNS LIST

3: discharge port, 4: chamber, 4A: recessed portion, 4B: discharge port, 5: discharge valve, 6: valve retainer, 7A: discharge muffler, 7B: discharge muffler, 8: fixing member, 10: compression mechanism unit, 11: compression chamber, 21: fixed scroll, 22: orbiting scroll, 23: base plate, 24: base plate, 25: scroll lap, 26: scroll lap, 27: orbiting-scroll boss, 30: motor unit, 31: stator, 32: rotor, 33: rotating shaft, 33a: eccentric shaft, 35: stator unit, 40: pressure container, 40a: oil sump, 41: upper container, 42: body, 43: lower container, 44: suction pipe, 45: discharge pipe, 46: first frame, 47: second frame, 48: ball bearing, 50: iron core, 51: core-back portion, 51a: inner circumferential surface, 52: tooth portion, 52a: tooth base, 52aa: side surface, 52b: tooth tip portion, 52c: outer circumferential surface, 53: slot portion, 54: recess, 55: winding, 60: upper insulating member, 61: central base portion, 62: inner circumferential wall portion, 63: outer circumferential wall portion, 63a: inner circumferential surface, 63b: slot, 63c: wire groove, 64: inner circumferential leg, 64a: first recess, 64b: second recess, 65: central leg, 65a: position fixing portion, 65aa: thick-walled portion, 65b: third recess, 66: outer circumferential leg, 66a: positioning portion, 66aa: thick portion, 66b: fourth recess, 67: insertion recess, 68: protrusion, 70: lower insulating member, 75a: position fixing portion, 80: insulating film, 80a: fold, 80b: dot-and-dash line, 81: central film portion, 81a: central protrusion, 82: inner circumferential film portion, 82a: inner circumferential protrusion, 83: outer circumferential film portion, 83a: cutout, 84: portion, 85: protruding portion, 100: compressor, J: central axis

The invention claimed is:

1. A motor comprising:
a stator unit formed by coupling a plurality of stators to one another into an annular shape,
wherein each of the stators has:
an iron core having an arc-shaped core-back portion and a tooth portion protruding from the core-back portion, the iron core forming slot portions between the iron core and adjacent ones of the stators;
insulating members disposed on both end portions, in an axial direction, of the iron core;
insulating films disposed so as to be in contact with inner walls of the slot portions of the iron core; and
a winding disposed in the slot portions and wound over the iron core with the insulating members and the insulating films interposed therebetween,
wherein the tooth portion of the iron core has a tooth base protruding from the core-back portion toward an inner circumferential side and tooth tip portions protruding in a circumferential direction from a distal end portion of the tooth base,
wherein each of the insulating films is disposed so as to be in contact with
an inner circumferential surface of the core-back portion, a side surface, in a circumferential direction, of the tooth base, and an outer circumferential surface of the tooth tip portion that are part of the inner wall of the slot portion,
wherein, in the insulating film, a portion that is in contact with an outer circumferential surface of the tooth tip portion and a portion that is in contact with a portion being part of a side surface, in a circumferential direction, of the tooth base and positioned beside the tooth tip portion have lengths in the axial direction longer than a length of the iron core in the axial direction, and a portion that is in contact with an outer circumferential surface of the tooth tip portion has a length in the axial direction longer than a length, in the axial direction, of a portion that is in contact with a portion being part of a side surface, in a circumferential direction, of the tooth base and positioned beside the tooth tip portion, and
wherein each of the insulating members has position fixing portions that are engaged with the iron core to fix a position of the insulating member.

2. The motor of claim 1,
wherein the insulating member has
a central base portion covering an end portion, in the axial direction, of the tooth base,
wherein the central base portion has paired central legs extending in the axial direction from both sides, in a circumferential direction, of the central base portion toward the slot portions, and
wherein the position fixing portions are paired thick-walled portions that are formed on the paired central legs and inwardly thickened, and the position fixing portions fix a position of the insulating member by the paired thick-walled portions holding the tooth base, therebetween, from both sides in a circumferential direction.

3. The motor of claim 2,
wherein the insulating film has a cutout that prevents the insulating film from interfering with each of the position fixing portions.

4. The motor of claim 2,
wherein the insulating member has an inner circumferential wall portion formed on an inner circumferential side relative to the tooth base,
wherein the inner circumferential wall portion has paired inner circumferential legs extending in the axial direction from both sides, in a circumferential direction, of the inner circumferential wall portion toward the slot portions, and
wherein the insulating member has insertion recesses into which end portions, in an axial direction, of the insulating films are inserted, and each of the insertion recesses is constituted by a first recess formed in the inner circumferential wall portion, a second recess formed at a proximal end of one of the paired inner circumferential legs, and a third recess formed at a proximal end of one of the paired central legs.

5. The motor of claim 1,
wherein the insulating member has an outer circumferential wall portion formed on an outer circumferential side relative to the tooth base,
wherein the outer circumferential wall portion has paired outer circumferential legs extending in the axial direction from both sides, in a circumferential direction, of the outer circumferential wall portion toward the slot portions, and
wherein the paired outer circumferential legs have positioning portions that position the insulating member in a radial direction in relation to the iron core, and the positioning portions are constituted by paired thick portions formed on outer circumferential surfaces, on an outer side in a radial direction, of the paired outer circumferential legs.

6. The motor of claim 1,
wherein the insulating member has
a central base portion covering an end portion, in the axial direction, of the tooth base,
wherein the central base portion has paired central legs extending in the axial direction from both sides, in a circumferential direction, of the central base portion toward the slot portions, and
wherein the position fixing portions are constituted by paired protrusions positioned on an inner side relative to the paired central legs, and the position fixing portions fix a position of the insulating member by the paired protrusions being engaged with paired recesses provided in the tooth base of the iron core.

7. The motor of claim 6,
wherein an entire portion of the insulating film that is in contact with the slot portion has a length in an axial direction longer than a length of the iron core in an axial direction.

8. A compressor comprising:
the motor of claim 1.

9. A motor comprising:
a stator unit formed by coupling a plurality of stators to one another into an annular shape,
wherein each of the stators has:
  an iron core having an arc-shaped core-back portion and a tooth portion protruding from the core-back portion, the iron core forming slot portions between the iron core and adjacent ones of the stators;
  insulating members disposed on both end portions, in an axial direction, of the iron core;
  insulating films disposed so as to be in contact with inner walls of the slot portions of the iron core; and
  a winding disposed in the slot portions and wound over the iron core with the insulating members and the insulating films interposed therebetween,
wherein the tooth portion of the iron core has a tooth base protruding from the core-back portion toward an inner circumferential side and tooth tip portions protruding in a circumferential direction from a distal end portion of the tooth base,
wherein each of the insulating films is disposed so as to be in contact with
an inner circumferential surface of the core-back portion, a side surface, in a circumferential direction, of the tooth base, and an outer circumferential surface of the tooth tip portion that are part of the inner wall of the slot portion,
at least a portion of the insulating film that is in contact with an outer circumferential surface of the tooth tip portion has a length in the axial direction longer than a length of the iron core in the axial direction, and
wherein each of the insulating members has
position fixing portions that are engaged with the iron core to fix a position of the insulating member, and
a central base portion covering an end portion, in the axial direction, of the tooth base,
wherein the central base portion has paired central legs extending in the axial direction from both sides, in a circumferential direction, of the central base portion toward the slot portions, and
wherein the position fixing portions are paired thick-walled portions that are formed on the paired central legs and inwardly thickened, and the position fixing portions fix a position of the insulating member by the paired thick-walled portions holding the tooth base, therebetween, from both sides in a circumferential direction,
wherein the insulating member has an inner circumferential wall portion formed on an inner circumferential side relative to the tooth base,
wherein the inner circumferential wall portion has paired inner circumferential legs extending in the axial direction from both sides, in a circumferential direction, of the inner circumferential wall portion toward the slot portions, and
  wherein the insulating member has insertion recesses into which end portions, in an axial direction, of the insulating films are inserted, and each of the insertion recesses is constituted by a first recess formed in the inner circumferential wall portion, a second recess formed at a proximal end of one of the paired inner circumferential legs, and a third recess formed at a proximal end of one of the paired central legs.

* * * * *